Feb. 23, 1943. R. C. LARSEN 2,311,671
MANURE LOADER
Filed Oct. 23, 1941 4 Sheets-Sheet 3
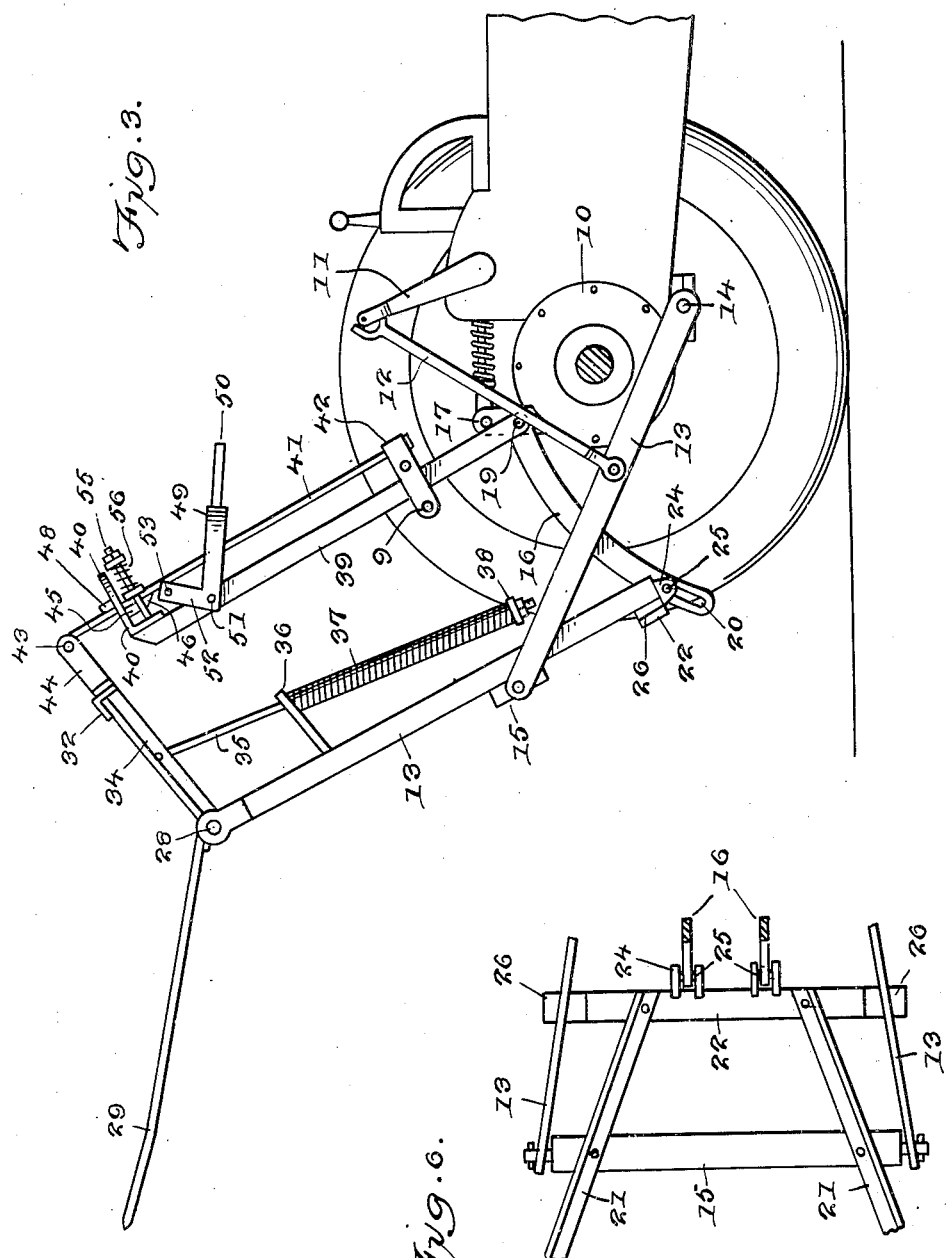
Russell C. Larsen
INVENTOR.
BY Victor J. Evans & Co.

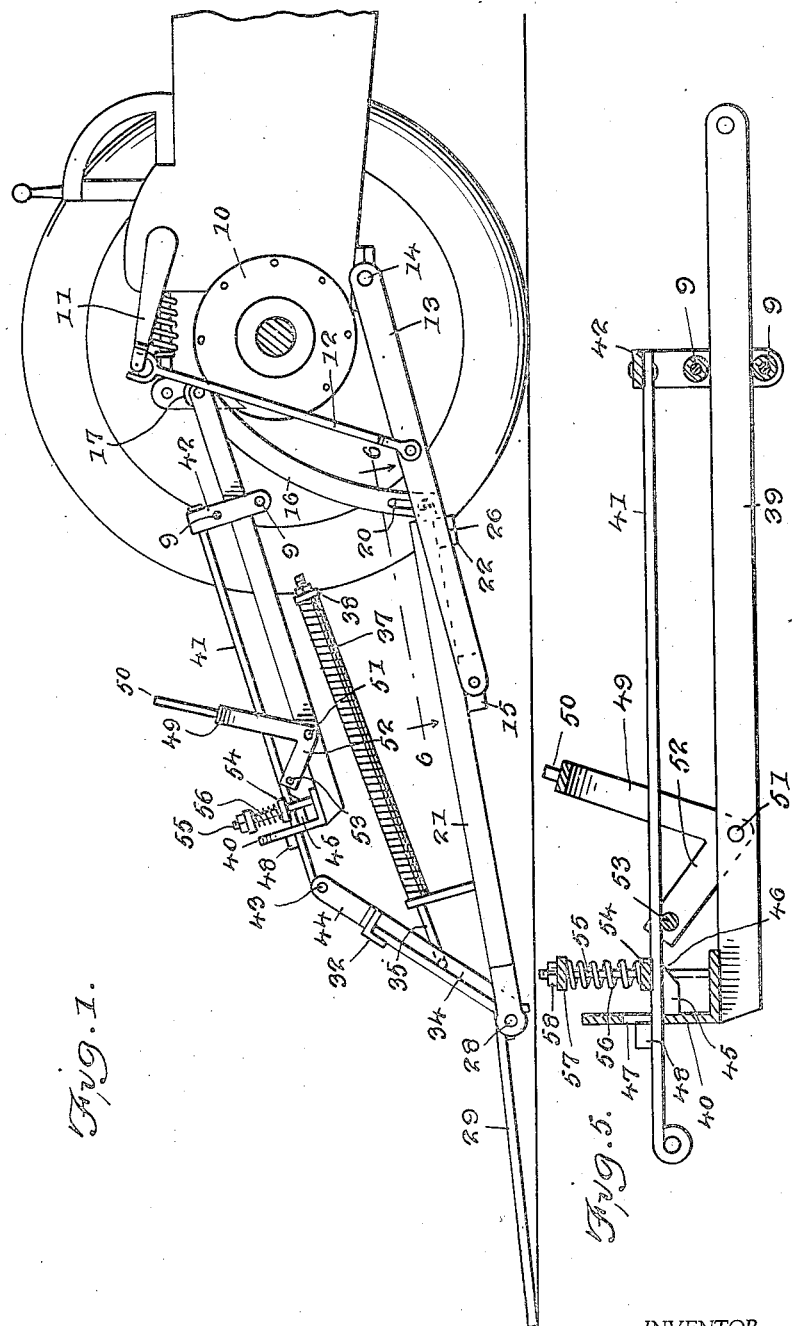

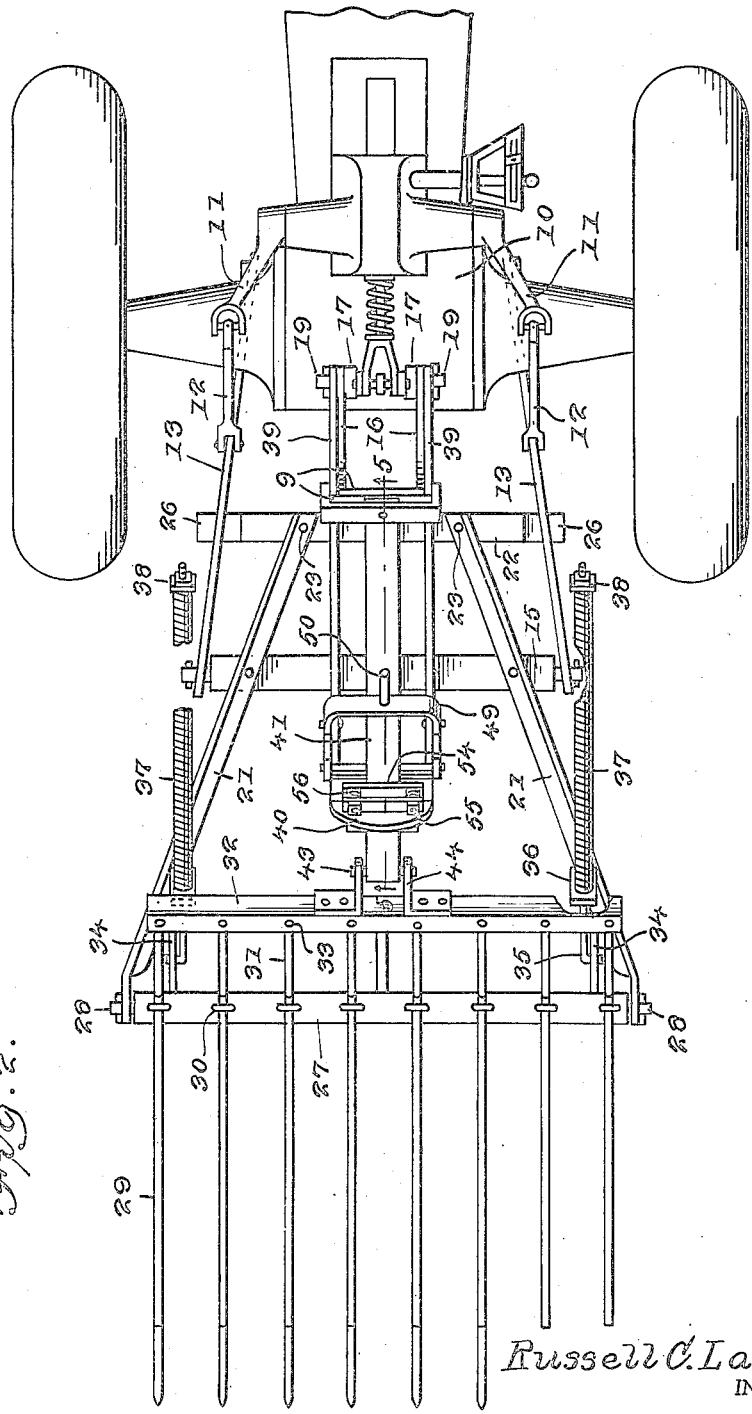

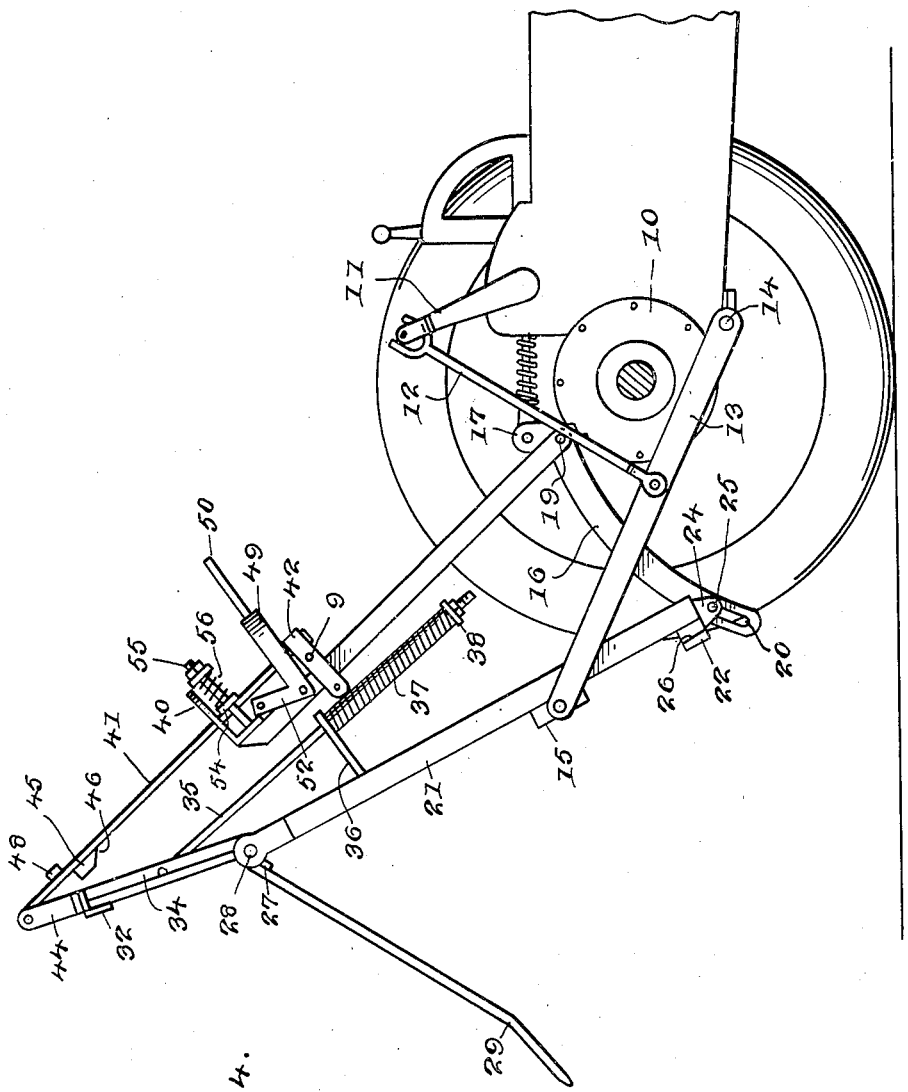

Patented Feb. 23, 1943

2,311,671

UNITED STATES PATENT OFFICE 2,311,671

MANURE LOADER

Russell C. Larsen, Hansen, Idaho

Application October 23, 1941, Serial No. 416,254

5 Claims. (Cl. 214—140)

This invention relates to a manure loader and has for an object to provide a fork and means for lifting the fork adapted to be connected to the differential housing and to the hydraulic lift of a tractor in such manner that the fork may be readily elevated from the loading position to its dumping position and then dumped without undue strain or any interlocking of the lifting arms, which arms have limited movement along slotted bracket arms to promote the advantage just described.

A further object is to provide a device of this character which will be formed of a few simple, strong and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification:

Figure 1 is a side elevation of a manure loader constructed in accordance with the invention, in loading position.

Figure 2 is a top plan view of the manure loader.

Figure 3 is a side elevation of the manure loader with the fork elevated.

Figure 4 is a side elevation of the manure loader with the fork in dumping position.

Figure 5 is a detail longitudinal sectional view taken on the line 5—5 of Figure 2, showing the trip mechanism for the fork.

Figure 6 is a detail longitudinal sectional view taken on the line 6—6 of Figure 1, showing the pivotal connections of the lifting arms with the slotted bracket arms.

Referring now to the drawings in which like characters of reference designate similar parts of the various views, 10 designates the differential housing, 11 the hydraulic lifting arms, 12 links connected to levers 13 which are pivoted as shown at 14 to the tractor body and are connected to the ends of a transversely disposed vertically movable tool bar 15. These parts are conventional tractor parts.

In carrying out the invention a pair of arcuate arms 16 are pivotally secured to lugs 17 which are secured to the differential housing 10, these lugs also being conventional. Pivot pins 19 are engaged through the lugs and through the upper ends of the arcuate arms. The lower ends of the arcuate arms are provided with longitudinal slots 20. These arcuate arms form pivoted bracket arms to support the manure loader.

The manure loader comprises diverging frame arms 21 which are secured to the intermediate portions of a transversely disposed frame bar 22 by bolts 23 or other connnectors. The frame bar is provided with brackets 24 to which pintles 25 are fixed. These pintles are engaged through the longitudinal slots 20 of the bracket arms 16 and abut the bottom of the slots when the frame bars 21 are lowered, and abut the top of the slots when the frame bars are raised, see Figures 1 and 4.

The upper sides at the ends of the transverse frame bar 22 are provided with cutaway portions which form stop shoulders 26. The stop shoulders engage the levers 13 when the frame arms 21 are lowered, see Figure 1, to limit downward movement of the fork to loading position. When the links 12 are swung upwardly by the hydraulic lifting arms 11 and links 12 the tool bar 15 will be lifted vertically from the position shown in Figure 1 to the position shown in Figure 3 and will rock the arms 21 upwardly to elevate the fork. In this position of the arms the pintles 25 are lodged against the upper ends of the slots 20 and prevent undue strain on the arms, or binding of the arms, at their connections with the bracket arms 16.

The fork comprises a transversely disposed bar 27 having gudgeons 28 at the ends received in openings formed in the ends of the diverging frame arms 21. Spaced tines 29 project in a plane forwardly from the bar 21 and are secured to the bar by staples 30. The tines are bent upwardly and rearwardly at the rear ends as shown at 31 to form the back of the fork and are secured at the upper ends to a transversely disposed angle bar 32, as shown at 33, in Figure 2. A pair of fork frame bars 34 are secured to the angle bar 32 at the upper ends and at the lower ends are secured to a transversely disposed bar 27.

For yieldably holding the fork in load receiving position, and also for returning the fork to load receiving position after the fork is dumped, a pair of rods 35 are pivotally secured at the front ends to the fork frame bars 34 and are slidably engaged in bracket arms 36 which are secured to the diverging frame arms 21, see Figure 4. Helical springs 37 are sleeved on the rods between the bracket arms 36 and nuts 38 threaded on the rear ends of the rods.

The springs are compressed, see Figure 4, as the fork is being rocked to dump a load and expand, see Figure 3, after the load has been dumped to return the fork to normal load receiving position.

The trip mechanism of the fork comprises a pair of bars 39 pivotally secured at the rear ends to the pivot pins 19 of the lugs 17 on the differential housing 10, see Figure 2. The bars are connected together at the front ends by a plate 40 of right angular cross section. A resilient trip bar 41 extends above and longitudinally between the bars 39. The trip bar is secured at the rear end to an inverted U-shaped bar 42 which is slidably secured to the bars 39 by rollers 9 engaged above and below the bars. The front end of the trip bar 41 is connected to a pivot pin 43, see Figure 2, carried by spaced angle brackets 44 which are secured to the angle bar 32 of the fork.

The bar 41 is releasably held at its rearward limit of sliding movement, see Figure 3, to hold the fork in load receiving position and for this purpose a stop lug 45, see Figures 3 and 4, is secured to the underneath face of the trip bar 41 and is provided with an inclined rear edge 46 forming a cam surface. The stop lug normally is lodged against the rear face of the upright leg of the angular plate 40 below an opening 47 formed in the leg, see Figure 5. A stop plate 48 is disposed on the top face of the trip bar 41 and normally lodges against the front face of the upright leg of the angular plate 40 to limit rear sliding movement of the trip bar 41 when the fork is being returned from dumping position to loading position.

An arched tripper 49 is provided with a handle 50 and is pivoted at the lower ends of its sides to the bars 39 by pivot pins 51. The tripper is provided with forwardly and upwardly inclined extensions 52 at the pivot pins 51. A roller 53 is secured to the extensions and normally engages the bottom face of the trip bar 41. When the tripper 49 is manually rocked on the pivot pins 51 the roller 53 deforms the resilient trip bar 41 upwardly to carry the stop lug 45 into alignment with the opening 47 whereupon the weight of the load on the fork rocks the fork to dumping position, see Figure 4, at which time the stop lug 45 passes through the opening 47. Upon return of the fork to normal position under urge of the springs 37 after the load has been dumped, the trip bar 41 is moved rearwardly and the cam face 46 of the stop lug strikes against the bottom wall of the opening 47 and deforms the trip bar 41 upwardly to permit the stop lug to ride through the opening 27 and be lodged in rear of the upright leg of the angular plate 40 by a presser plate 54.

The presser plate 54 is engaged transversely across the top face of the trip bar 41 and is slidably engaged on upwardly extending rods 55 carried by the lower leg of the angular plate 40. Helical springs 56 are sleeved on the rods and confined under tension between the presser plate 54 and a plate 57 which is secured to the upper ends of the rods by nuts 58 which are threaded onto the rods. The springs 56 tend constantly to hold the trip plate in position to dispose the lug 45 in engagement with the rear face of the upright leg of the angular plate 40, and also to engage the roller 53 of the tripper 49 to hold the tripper in position to be manually tripped to dump the fork as heretofore described.

Since the operation of the parts has been described as the description progressed it is thought that the invention will be fully understood without further explanation.

What is claimed is:

1. A manure loader comprising, the combination with a tractor having a differential housing, a vertically movable tool bar and arms pivoted on the tractor for moving the tool bar, of a pair of downwardly extending arcuate bracket arms pivotally secured at the upper ends to the housing and having longitudinal arcuate slots in the lower ends, diverging frame arms supported upon the tool bar to be elevated by the tool bar, a transversely disposed bar connected to the rear ends of the frame arms and engaged at the ends underneath the tool bar moving arms, hinge pintles carried by the transversely disposed bar slideably engaged in said slots and adapted to engage the bottom walls of the slots when the frame arms are lowered and adapted to engage the top walls of the slots when the frame arms are raised, a fork pivoted to the upper ends of the frame arms, releasable means for holding the fork in load supporting position, manually operable trip means for releasing the fork holding means to dump the fork, and spring means carried by the frame arms for resetting the fork each time the fork is dumped.

2. The structure as of claim 1 and in which the releasable means for holding the fork in load supporting position comprises, a pair of parallel bars above the frame arms pivotally secured at the rear ends to the housing, a plate of right angular cross section connecting the front ends of the bars together, a resilient bar pivotally connected at the front end to the fork and extending through an opening in the plate, an inverted U-shape bar connected to the rear end of the resilient bar and slideably secured to the parallel bars by rollers engaged above and below the parallel bars, a stop lug on the underneath face of the resilient bar engaged against the rear side of said plate and having a cam surface, a stop member on the top face of the resilient bar engaged against the front side of said plate, said stop lug and stop member holding the resilient bar stationary to hold the fork in loading position, said stop lug passing through said opening in the plate when the resilient bar is deformed upwardly to permit the resilient bar to move endwise forwardly and so that the weight of the load may move the fork to dumping position.

3. The structure as of claim 1 and in which the spring means for resetting the fork comprises brackets extending upwardly from the frame arms near the fork, rods pivotally connected at the front ends to the fork and slideably engaged through openings in the brackets, nuts on the rear ends of the rods, and springs sleeved on the rods between the brackets and the nuts adapted to be compressed by forward movement of the rods when the fork is dumped and store up energy to expand and return the fork to load supporting position after the load is dumped.

4. A manure loader, the combination with a tractor having a differential housing, hydraulic lifting arms carried by the tractor, levers pivotally connected to the tractor, a tool bar pivotally connected to the outer ends of the levers, a diverging frame secured to the tool bar intermediate its ends, arcuate arms pivotally connected to the tractor and having segmental slots in their lower ends, pivots carried by the inner ends of the diverging frame and moving in said slots, a fork pivotally connected intermediate its ends to the diverging frame, links pivotally connected to the fork and extending through brackets carried by the diverging frame having heads at their inner ends, springs surrounding the links between the heads and the brackets carried by the diverging frame, means for holding the fork in its digging position, and means for releasing the fork holding means, whereby the springs will return the fork to the digging position.

5. A manure loader, the combination with a tractor having a differential housing, hydraulic lifting arms carried by the tractor, levers pivotally connected to the tractor, links connecting the levers to the hydraulic lifting arms, a tool bar pivotally connected to the outer ends of the levers, a diverging frame pivotally connected to a transverse tool bar, pivot pins carried by the inner ends of the diverging frame, arcuate arms pivotally connected to the tractor and having segmetnal slots in their lower ends receiving the pivot carried by the diverging frame, an L-shaped fork pivotally connected intermediate its ends to the outer end of the diverging frame, links pivotally connected to the fork above its pivotal connection with the diverging frame and loosely passing through rigid brackets carried by the diverging frame and having headed ends, coil springs surrounding the links between the headed ends and the rigid brackets, arms carried by the tractor, a rolling carriage mounted on the arms, means for locking the carriage in its adjusted position on the arms, and links connecting the outer ends of the fork with the carriage, whereby the fork is held in operative position by the carriage and when released will be returned to operative position.

RUSSELL C. LARSEN.